US012600312B2

(12) United States Patent　　　　　(10) Patent No.:　　US 12,600,312 B2
Iwama et al.　　　　　　　　　　　　　(45) Date of Patent:　　　Apr. 14, 2026

---

(54) SEAT-MOUNTED AIRBAG DEVICE

(71) Applicant: TOYOTA JIDOSHA KABUSHIKI KAISHA, Aichi-ken (JP)

(72) Inventors: Toshiki Iwama, Toyota (JP); Mitsuyoshi Ohno, Miyoshi (JP); Yu Suzuki, Nagoya (JP); Tatsuya Hashido, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/792,559

(22) Filed: Aug. 2, 2024

(65) Prior Publication Data

US 2025/0058733 A1　　Feb. 20, 2025

(30) Foreign Application Priority Data

Aug. 14, 2023　(JP) ................................. 2023-132159

(51) Int. Cl.
　　*B60R 21/207*　　　(2006.01)
　　*B60R 21/231*　　　(2011.01)
(52) U.S. Cl.
　　CPC .......... *B60R 21/207* (2013.01); *B60R 21/231* (2013.01); *B60R 2021/2074* (2013.01)
(58) Field of Classification Search
　　CPC ............... B60R 21/207; B60R 21/231; B60R 2021/2074; B60R 2021/23146
　　See application file for complete search history.

(56) References Cited

U.S. PATENT DOCUMENTS

| | | | |
|---|---|---|---|
| 5,911,433 A | 6/1999 | Swann | |
| 7,150,468 B2 * | 12/2006 | Pan | B60R 21/207 |
| | | | 280/730.1 |
| 7,922,190 B2 * | 4/2011 | Sugimoto | B60R 21/233 |
| | | | 280/736 |
| 8,448,983 B2 * | 5/2013 | Fukawatase | B60R 22/26 |
| | | | 280/808 |

(Continued)

FOREIGN PATENT DOCUMENTS

| | | | |
|---|---|---|---|
| DE | 102017131121 A1 * | 6/2019 | |
| EP | 0884214 A1 | 12/1998 | |

(Continued)

OTHER PUBLICATIONS

DE-102017131121-A1 (machine translation) (Year: 2019).*
Unpublished JP Application No. 2023-132161, filed Aug. 14, 2023, 102pp.

*Primary Examiner* — Jason D Shanske
*Assistant Examiner* — Joselynn Y Sliteris
(74) *Attorney, Agent, or Firm* — HAUPTMAN HAM, LLP

(57)　　　　　ABSTRACT

A seat-mounted airbag device is provided with an airbag including front-and-rear chambers and an airbag main body. At a time of collision of a vehicle, gas jetted out from an inflator is supplied to the front-and-rear chambers, which inflate and expand to a front side along left and right sides of the head of a vehicle occupant. In association with the inflation and expansion of the front-and-rear chambers, the airbag main body moves to the front side, passing between the head of the vehicle occupant and a vehicle cabin ceiling. The gas is supplied from the front-and-rear chambers to the airbag main body, which inflates and expands and is disposed at the front side of the vehicle occupant.

2 Claims, 15 Drawing Sheets

(56)     References Cited

U.S. PATENT DOCUMENTS

| | | | | |
|---|---|---|---|---|
| 9,919,673 B2 * | 3/2018 | Ohno | .................. | B60R 21/2338 |
| 9,944,246 B2 * | 4/2018 | Ohno | ............... | B60R 21/23138 |
| 9,950,687 B2 * | 4/2018 | Kato | .................... | B60R 21/233 |
| 10,005,417 B2 * | 6/2018 | Ohno | .................. | B60R 21/2334 |
| 10,071,702 B2 * | 9/2018 | Ohno | .................. | B60R 21/207 |
| 10,112,570 B2 * | 10/2018 | Barbat | .................. | B60N 2/143 |
| 10,246,043 B2 * | 4/2019 | Schneider | ............. | B60R 21/235 |
| 10,953,836 B2 * | 3/2021 | Wold | .................... | B60R 21/233 |
| 11,040,691 B2 * | 6/2021 | Faruque | ............. | B60R 21/2338 |
| 11,285,902 B2 * | 3/2022 | Choi | .................... | B60R 21/013 |
| 11,285,904 B2 * | 3/2022 | Jung | .................. | B60R 21/2338 |
| 12,291,161 B2 * | 5/2025 | Ohno | .................. | B60R 21/231 |
| 12,296,776 B2 * | 5/2025 | Ohno | .................. | B60R 21/231 |
| 12,358,455 B2 * | 7/2025 | Iwama | ............. | B60R 21/23138 |
| 2017/0050602 A1 * | 2/2017 | Vinton | .................. | B60N 2/809 |
| 2017/0136976 A1 | 5/2017 | Ohno et al. | | |
| 2019/0016293 A1 | 1/2019 | Saso | | |
| 2024/0123937 A1 | 4/2024 | Ohno et al. | | |
| 2025/0263039 A1 * | 8/2025 | Ohno | .................. | B60R 21/232 |

FOREIGN PATENT DOCUMENTS

| | | | |
|---|---|---|---|
| JP | 2017-094767 A | 6/2017 |
| JP | 2019-018593 A | 2/2019 |
| JP | 2019-218013 A | 12/2019 |
| JP | 2024-058404 A | 4/2024 |

* cited by examiner

SEAT-MOUNTED AIRBAG DEVICE

CROSS-REFERENCE TO RELATED APPLICATION

This application is based on and claims priority under 35 USC § 119 from Japanese Patent Application No. 2023-132159 filed on Aug. 14, 2023, the disclosure of which is incorporated by reference herein.

TECHNICAL FIELD

The present disclosure relates to a seat-mounted airbag device.

RELATED ART

An airbag device that has been known since heretofore (for example, see Japanese Patent Application Laid-Open (JP-A) No. 2019-218013 (Patent Reference 1)) is provided with: a rear inflation portion that expands to a rear face side of a seat; a pair of side inflation portions that extend forward from left and right sides of the rear inflation portion; and a pair of front inflation portions that extend from the side inflation portions to the middle side, are joined with one another at the middle side, and cover the front of a vehicle occupant.

A further airbag device that has been known since heretofore (for example, see JP-A No. 2019-018593 (Patent Reference 2)) is provided with a bag body including: a torso support portion that expands to the front of a vehicle occupant from behind the head of the vehicle occupant; and a pair of head support portions that expand at both left and right sides of the head of the vehicle occupant and are continuous with the torso support portion. An escape portion is formed at the bag body that, in an expanded state, penetrates between the pair of head support portions in the vertical direction and clears the head of the vehicle occupant.

In an airbag device such as those described above, while inflating and expanding from a seat back, an airbag (bag body) passes through a gap between the head of a vehicle occupant and a ceiling, and is disposed at the front side of the vehicle occupant. However, if there is an irregularity in folding of the airbag or the like, the airbag acting to inflate and expand may swing in the vertical direction and/or the left-and-right direction, and the expansion action may not be consistent.

SUMMARY

Accordingly, an object of the present disclosure is to provide a seat-mounted airbag device that makes an expansion action of an airbag main body consistent, in which expansion action the airbag main body passes between the head of a vehicle occupant and a vehicle cabin ceiling, inflates and expands, and is disposed at the seat front side of the vehicle occupant.

In order to achieve the object described above, a seat-mounted airbag device according to a first aspect includes: an inflator provided at a vehicle seat, the inflator jetting out a gas at a time of collision of the vehicle; and an airbag including a pair of front-and-rear chambers to which the gas jetted out from the inflator is supplied, the pair of front-and-rear chambers inflating and expanding to a seat front side along both left and right sides of the head of a vehicle occupant sitting on the vehicle seat, and an airbag main body that, in association with the inflation and expansion of the pair of front-and-rear chambers, passes between the head of the vehicle occupant and a vehicle cabin ceiling and moves to the seat front side, gas being supplied to the airbag main body from the pair of front-and-rear chambers and the airbag main body inflating and expanding toward the seat rear side between the pair of front-and-rear chambers and being disposed at the seat front side of the vehicle occupant. In an elevation view seen from the seat front side, the pair of front-and-rear chambers are folded toward the seat lower side relative to the airbag main body and stowed in a headrest of the vehicle seat. In a side view seen in the seat width direction, a jetting out aperture at which the gas is jetted out from the inflator is disposed at a vertical direction central portion of the seat rear side of the pair of front-and-rear chambers.

According to the first aspect, at a time of collision of the vehicle, the gas jetted out from the inflator is supplied to the pair of front-and-rear chambers, and the pair of front-and-rear chambers inflate and expand to the seat front side along the left and right sides of the head of the vehicle occupant sitting on the vehicle seat. In association with the inflation and expansion of the pair of front-and-rear chambers, the airbag main body moves to the seat front side, passing between the head of the vehicle occupant sitting on the vehicle seat and the vehicle cabin ceiling, and the gas is supplied from the pair of front-and-rear chambers to the airbag main body. Hence, the airbag main body inflates and expands toward the seat rear side between the pair of front-and-rear chambers and is disposed at the seat front side of the vehicle occupant. The meaning of the term "at a time of collision" as used herein is intended to encompass a prediction (forecast) that a collision is unavoidable.

In an elevation view seen from the seat front side, the pair of front-and-rear chambers of this airbag are folded to the seat lower side relative to the airbag main body and stowed in the headrest of the vehicle seat. In a side view seen in the seat width direction, the jetting out aperture for the gas jetted out from the inflator is disposed at the vertical direction central portion of the seat rear side of the pair of front-and-rear chambers.

Therefore, when the pair of front-and-rear chambers start to inflate and expand, the vertical direction central portion of the seat rear side of the pair of front-and-rear chambers may be pushed out toward the seat front side. Thus, an expansion direction of the pair of front-and-rear chambers is consistent. That is, an expansion action in which the airbag main body inflates and expands, passing between the head of the vehicle occupant and the vehicle cabin ceiling, and is disposed at the seat front side of the vehicle occupant is consistent. The meaning of the term "vertical direction central portion" as used herein is intended to encompass vertical direction substantially central portions that are offset a little in the vertical direction from a central portion.

In a seat-mounted airbag device according to a second aspect, the seat-mounted airbag device of the first aspect further includes distribution piping that is provided at the vehicle seat and is capable of supplying the gas jetted out from the inflator to each of the pair of front-and-rear chambers, wherein the distribution piping includes jetting out apertures that are connected to respective source portions of the pair of front-and-rear chambers and, in a side view seen in the seat width direction, the jetting out apertures extend a predetermined length to a seat front-upper side and the jetting out apertures are disposed at vertical direction central portions of the seat rear sides of the pair of front-and-rear chambers.

According to the second aspect, the distribution piping capable of supplying the gas jetted out from the inflator to each of the pair of front-and-rear chambers is provided at the vehicle seat. This distribution piping includes the jetting out apertures that are connected to each of the source portions of the pair of front-and-rear chambers. In a side view seen in the seat width direction, the jetting out apertures extend by the predetermined lengths to the seat front-upper side and are disposed at the vertical direction central portions of the seat rear sides of the pair of front-and-rear chambers.

Therefore, when the pair of front-and-rear chambers start to inflate and expand, the vertical direction central portions of the seat rear sides of the pair of front-and-rear chambers may be pushed out toward the seat front side more effectively, and the expansion direction of the pair of front-and-rear chambers is consistent. Moreover, because the distribution piping is provided, a mounting position of the inflator is not subject to constraint. Thus, the inflator may be mounted, for example, along a direction of extension of the seat back, and an increase in size (an increase in thickness) of the seat back is restrained. The meaning of the term "vertical direction central portion" as used here is intended to encompass vertical direction substantially central portions that are offset a little in the vertical direction from the central portion.

In a seat-mounted airbag device according to a third aspect, in the seat-mounted airbag device of the first aspect or the second aspect, source portions of the pair of front-and-rear chambers that are connected to the jetting out apertures are stowed in the headrest in a state in which, in a side view seen in the seat width direction, the source portions are folded in upward protruding shapes.

According to the third aspect, the pair of front-and-rear chambers are stowed in a state in which the source portions connected to the jetting out apertures are folded in the upward protruding shapes in a side view seen in the seat width direction. Therefore, when the source portions of the pair of front-and-rear chambers inflate, the vertical direction central portions of the seat rear sides of the front-and-rear chambers may be pushed out toward a vehicle front-lower side, and the expansion direction of the pair of front-and-rear chambers is made consistent more effectively.

As described above, according to the present disclosure, an expansion action of an airbag main body in which the airbag main body inflates and expands, passing between the head of a vehicle occupant and a vehicle cabin ceiling, to be disposed at the seat front side of a vehicle occupant may be made consistent.

DETAILED DESCRIPTION

Figure 1:
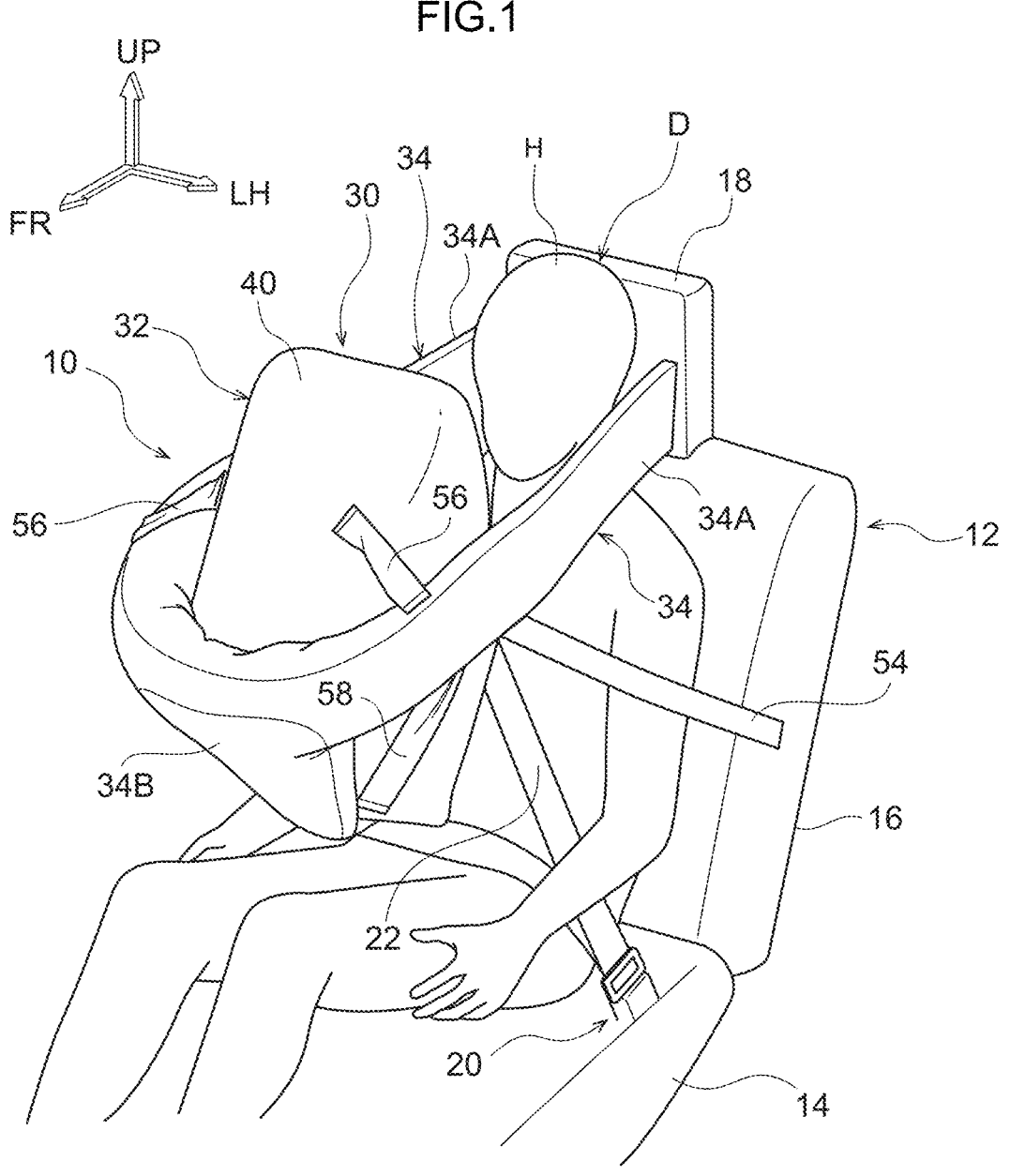
FIG. 1 is a schematic perspective view showing a state in which an airbag of a seat-mounted airbag device according to a first exemplary embodiment has inflated and expanded.

Below, exemplary embodiments relating to the present invention are described in detail in accordance with the drawings. For convenience of description, the arrow UP that is shown where appropriate in the drawings indicates an upper direction of a vehicle and a vehicle seat, an arrow FR indicates a front direction of the vehicle and vehicle seat, an arrow RH indicates a right direction of the vehicle and vehicle seat, and an arrow LH indicates a left direction. Where the directions upper, lower, front, rear, left and right are used in the descriptions below without being particularly specified, the same represent upper, lower, front, rear, left and right of the vehicle and the vehicle seat. The left-and-right direction is equivalent to a vehicle width direction and a seat width direction.

First Exemplary Embodiment

First, a seat-mounted airbag device (below referred to as simply as the airbag device) 30 according to a first exemplary embodiment is described. As shown in FIG. 1, a vehicle occupant protection apparatus 10 is structured by a vehicle seat 12 and the airbag device 30. The vehicle seat 12 is a front seat or rear seat of a vehicle (a car). In this exemplary embodiment, rather than a front seat 13, a rear seat serves as the vehicle seat 12 (see FIG. 12 to FIG. 14).

Figure 2:
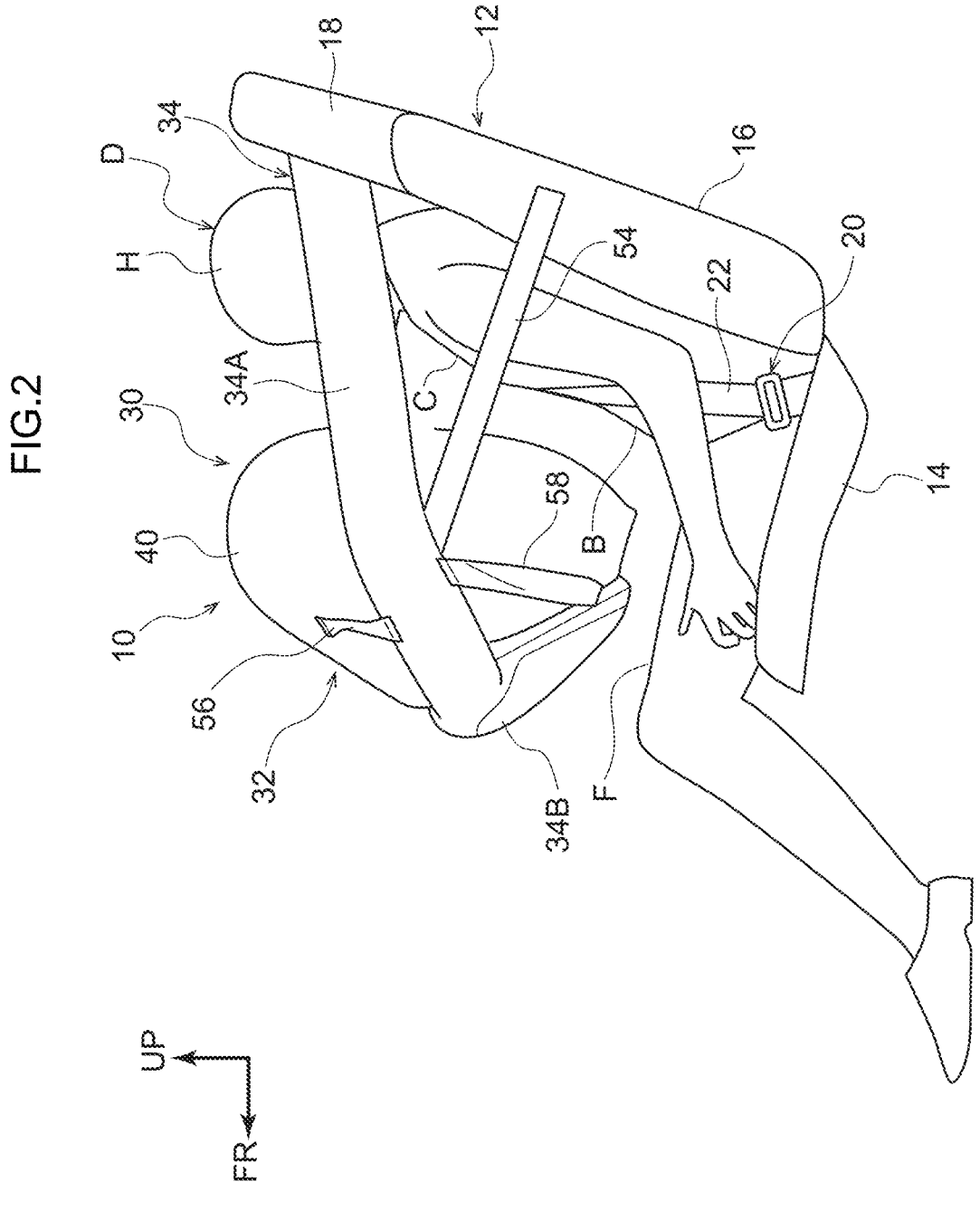
FIG. 2 is a schematic side view showing the state in which the airbag of the seat-mounted airbag device according to the first exemplary embodiment has inflated and expanded.
Figure 3:
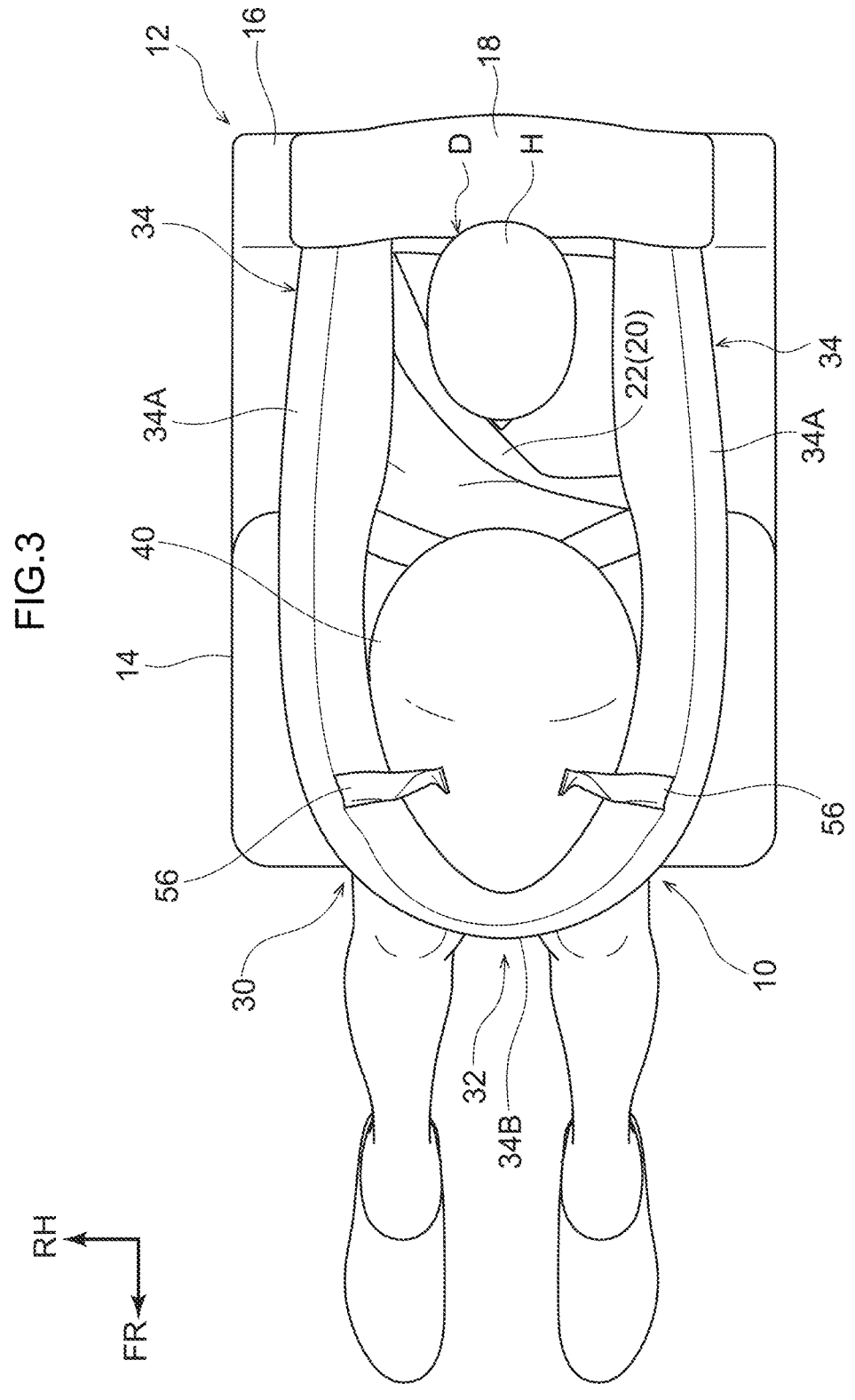
FIG. 3 is a schematic plan view showing the state in which the airbag of the seat-mounted airbag device according to the first exemplary embodiment has inflated and expanded.

FIG. 1 to FIG. 3 depict a state in which a crash test dummy (a human body dummy) serving as a model of a vehicle occupant (seat occupant) who should be protected is seated on the vehicle seat 12. The dummy is, for example, a frontal crash test dummy (Hybrid III), AM 50 (the 50th percentile of American adult males). The dummy is seated in a standard sitting attitude designated for impact testing, and the vehicle seat 12 is disposed at a standard specified position corresponding to the sitting attitude. Below, the dummy is referred to as "the occupant D".

The vehicle seat 12 includes a seat cushion 14 and a seat back 16. The occupant D sits on the seat cushion 14 (which supports a buttock area and a thigh area F of the occupant D). In a side view seen in the seat width direction, the seat back 16 is provided so as to extend to the upper side from the rear side of the seat cushion 14, is provided so as to be turnable about an axial direction that is in the seat width direction, and supports a back area of the occupant D. The seat back 16 integrally includes a headrest 18 at a seat width direction middle portion of an upper end portion of the seat back 16. The headrest 18 supports a head area H of the occupant D. A rear wall of the headrest 18 is constituted by a back board 19 (see FIG. 10).

As shown in FIG. 1 to FIG. 3, the occupant D sitting on the seat cushion 14 of the vehicle seat 12 is restrained at the vehicle seat 12 by a seatbelt 22 provided at a seatbelt apparatus 20. The seatbelt apparatus 20 is a three-point seatbelt apparatus, which is a belt-in-seat seatbelt apparatus in which a retractor, an anchor and a buckle, which are not shown in the drawings, are each provided at the vehicle seat 12.

Figure 8:
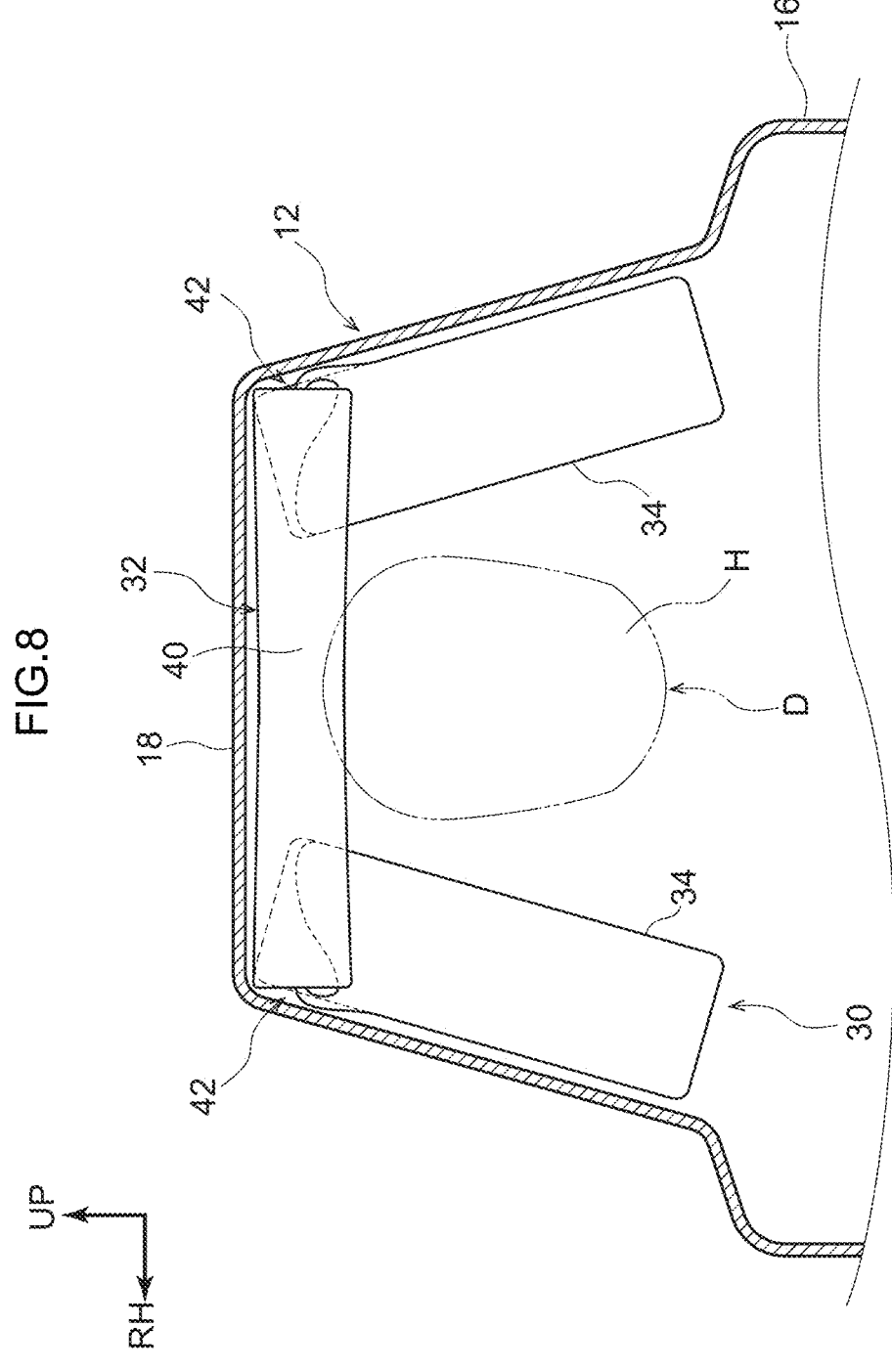
FIG. 8 is a schematic elevation view showing a partial section of the airbag according to the first exemplary embodiment stowed in a headrest.
Figure 9:
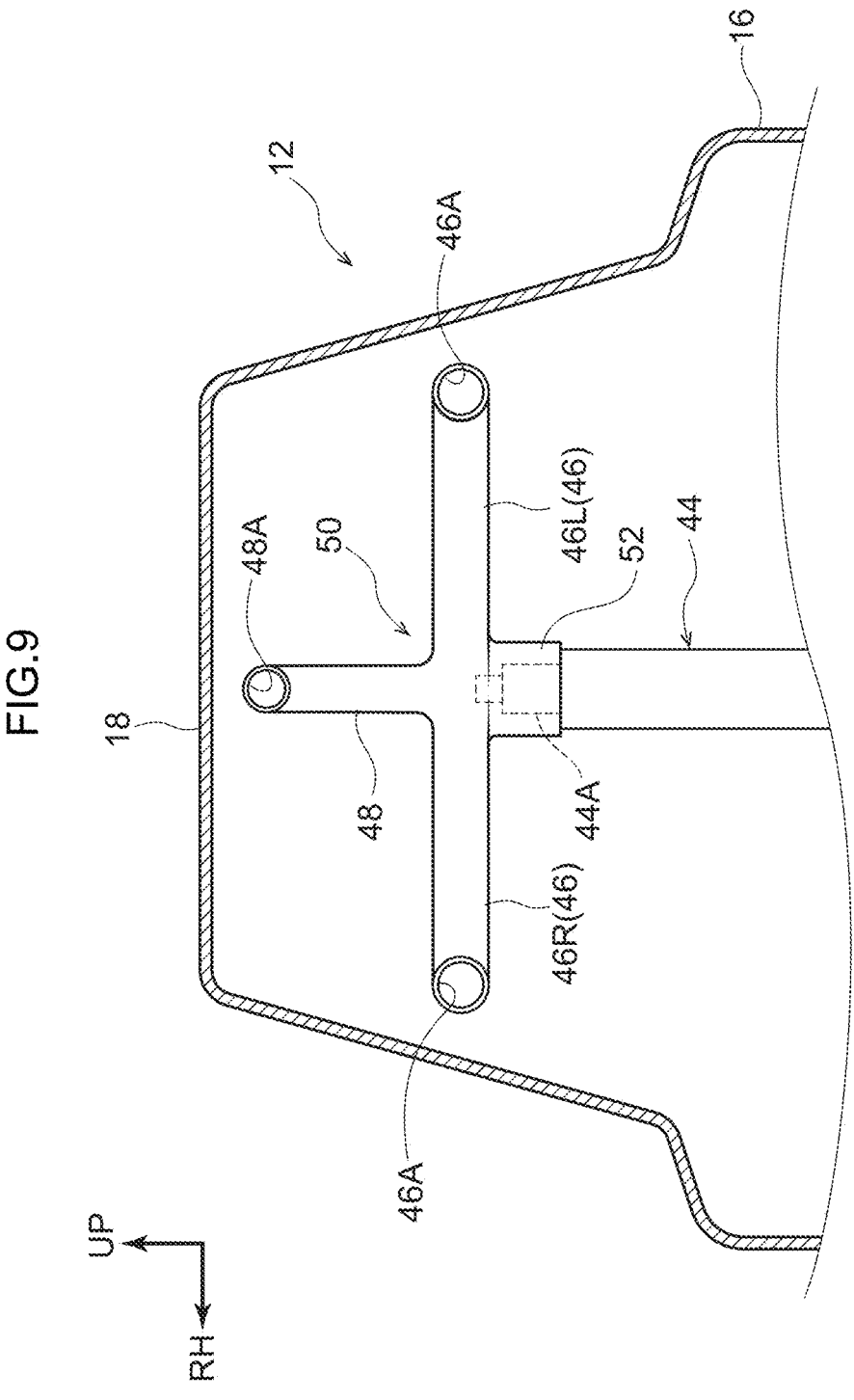
FIG. 9 is a schematic elevation view showing shapes of distribution piping according to the first exemplary embodiment in a partial section omitting the airbag.
Figure 10:
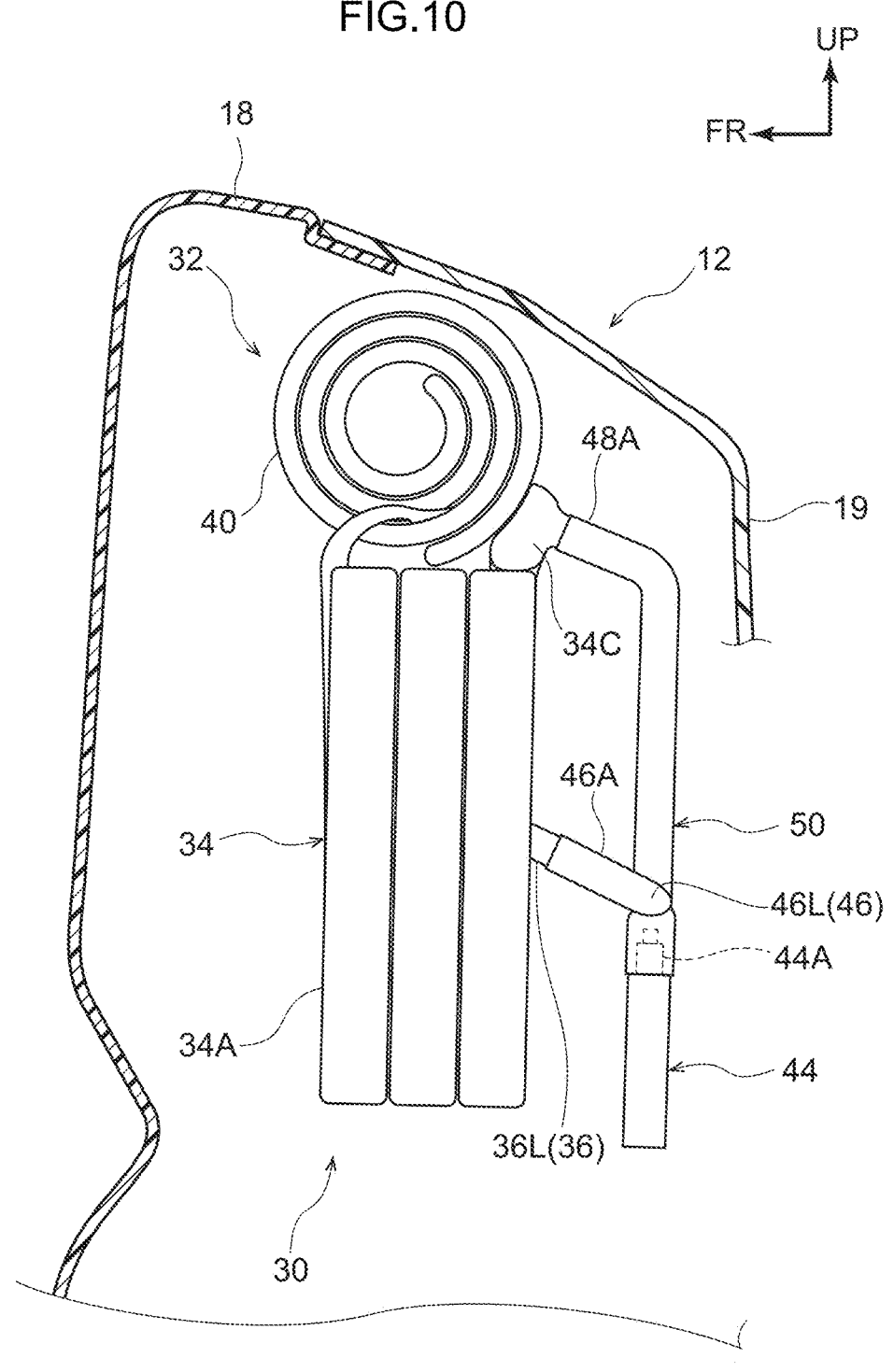
FIG. 10 is a schematic side view showing a partial section of the airbag according to the first exemplary embodiment stowed in the headrest.

The airbag device 30 is provided with an airbag 32 and a single inflator 44 (see FIG. 9 and FIG. 10). At usual times, the airbag 32 is stowed inside the headrest 18 in a folded state (see FIG. 8, FIG. 10 and FIG. 11). The inflator 44 is, for example, a combustion-type inflator or a cold gas-type inflator, of a cylinder type formed in a substantially cylindrical shape. The inflator 44 is provided along a direction of extension of the seat back 16 (with an axial direction of the inflator 44 in a vertical direction). The inflator 44 is provided inside the seat back 16 or spanning from the interior of the seat back 16 to the interior of the headrest 18.

The airbag device 30 is also provided with a control unit (ECU), which is not shown in the drawings, that controls operation of the inflator 44. The control unit is electronically connected with the inflator 44 and collision sensors (including a camera and the like), which are not shown in the drawings. The control unit is configured to be capable of detecting a frontal collision of the vehicle or predicting that a frontal collision is unavoidable. When, on the basis of information from the collision sensors, the control unit detects or predicts a frontal collision of the vehicle, the control unit activates the inflator 44.

That is, when a frontal collision of the vehicle is detected or predicted (which below may be referred to as "a time of frontal collision of the vehicle"), the inflator 44 is activated by the control unit and is caused to produce gas and jet out the gas from a jetting out aperture 44A (see FIG. 9 and FIG. 10). Modes of frontal collision of the vehicle in which the control unit activates the inflator 44 include, in addition to a full-overlap frontal collision, offset frontal collisions such as an oblique collision, a small-overlap frontal collision and so forth.

When the airbag 32 is supplied with gas jetted out from the inflator 44, the airbag 32 expands and inflates from a front face of the headrest 18, passing along both the left and right sides of the head area H of the occupant D sitting on the vehicle seat 12 and the upper side of the head area H of the occupant D, to the front side. Described more specifically, the airbag 32 includes a pair of front-and-rear chambers 34 and an airbag main body 40.

Figure 4:
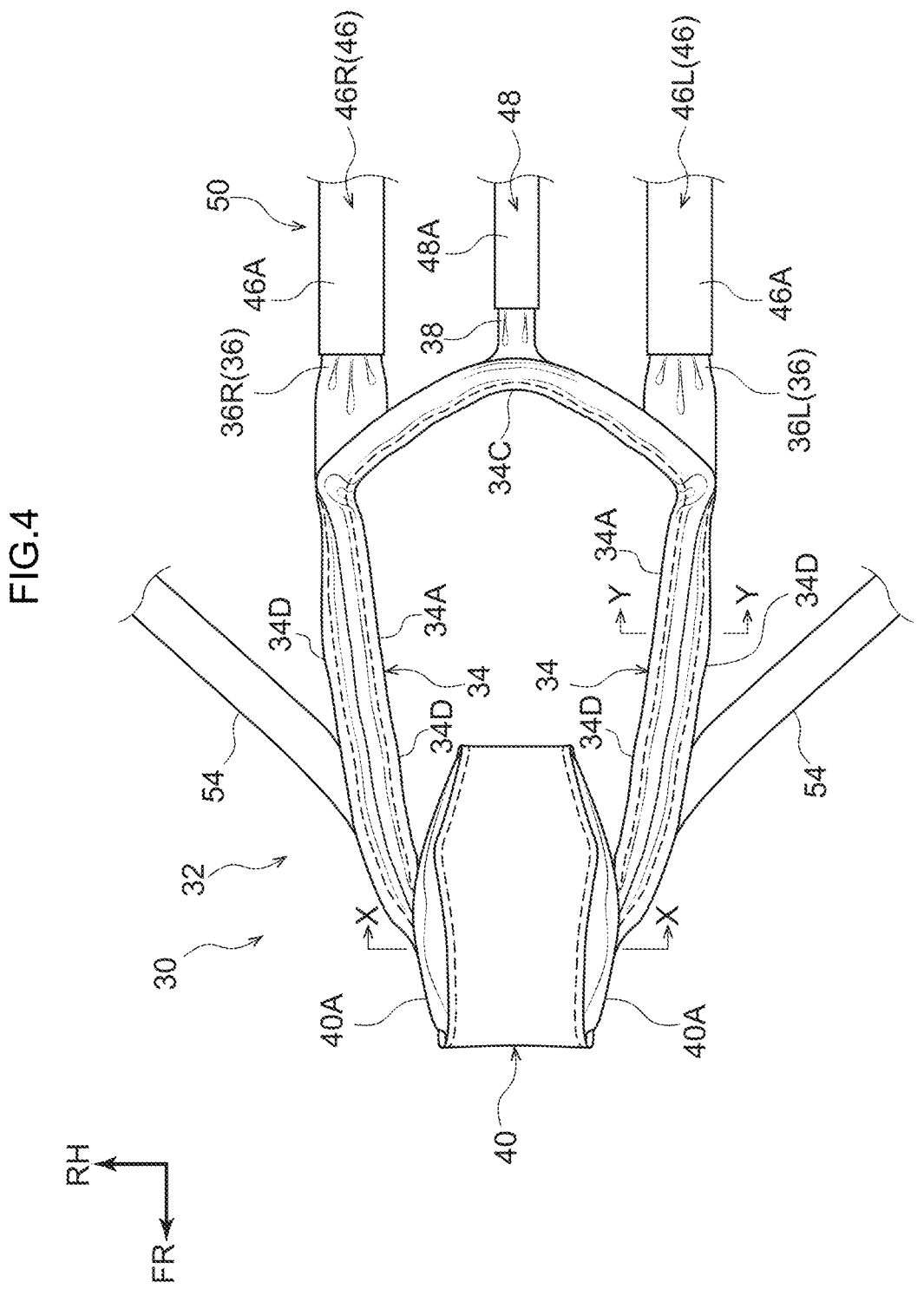
FIG. 4 is a schematic plan view showing a state of the airbag according to the first exemplary embodiment before folding.

As shown in FIG. 4, the pair of front-and-rear chambers 34 include a left and right pair of front-and-rear extending portions 34A, a front side connecting portion 34B (see FIG. 1 to FIG. 3), and a rear side connecting portion 34C. When the pair of front-and-rear extending portions 34A are supplied with gas jetted out from the inflator 44, the pair of front-and-rear extending portions 34A inflate and expand along both left and right sides of the head area H of the occupant D and extend in the front-and-rear direction. The front side connecting portion 34B joins front end portions of the pair of front-and-rear extending portions 34A in the left-and-right direction. The rear side connecting portion 34C joins rear end portions of the pair of front-and-rear extending portions 34A in the left-and-right direction.

The front side connecting portion 34B is formed in a substantially "T"-shaped bag shape in elevation view (see FIG. 1 to FIG. 3) that is connected with the pair of front-and-rear extending portions 34A. Source portions 36 with circular tube shapes are integrally formed at rear end portions of the pair of front-and-rear chambers 34 (the front-and-rear extending portions 34A), that is, at both of seat width direction end portions of a rear face of the rear side connecting portion 34C. Each source portion 36 extends to the rear side. A source portion 38 with a circular tube shape is integrally formed at a seat width direction central portion of the rear face of the rear side connecting portion 34C. The source portion 38 extends to the rear side.

Below, the source portion 36 at the left side may be described as "the source portion 36L" and the source portion 36 at the right side may be described as "the source portion 36R". The left and right source portions 36 and the central source portion 38 are connected to, respectively, jetting out apertures 46A and 48A of distribution pipes 46 and 48 of distribution piping (a diffuser) 50, which are each described below. The front-and-rear chambers 34 are each formed in a long, narrow bag shape (tube shape) by two long, narrow base cloths being superposed and upper and lower peripheral edge portions thereof being sewn together (see FIG. 5B).

Figure 12:
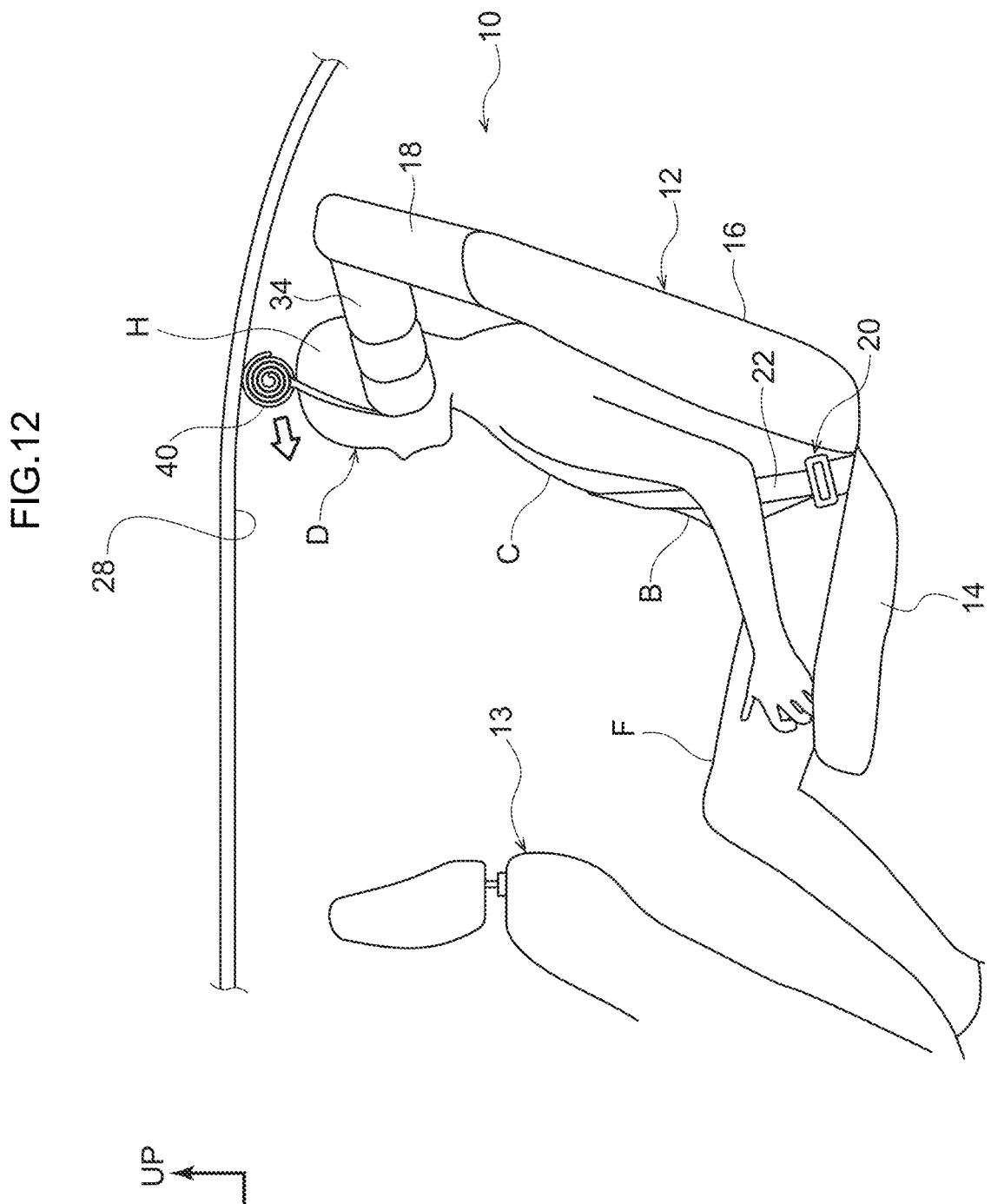
FIG. 12 is a schematic side view showing an initial time of inflation and expansion of the airbag according to the first exemplary embodiment.
Figure 13:
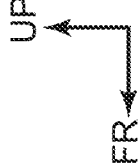
FIG. 13 is a schematic side view showing an intermediate time of the inflation and expansion of the airbag according to the first exemplary embodiment.
Figure 14:
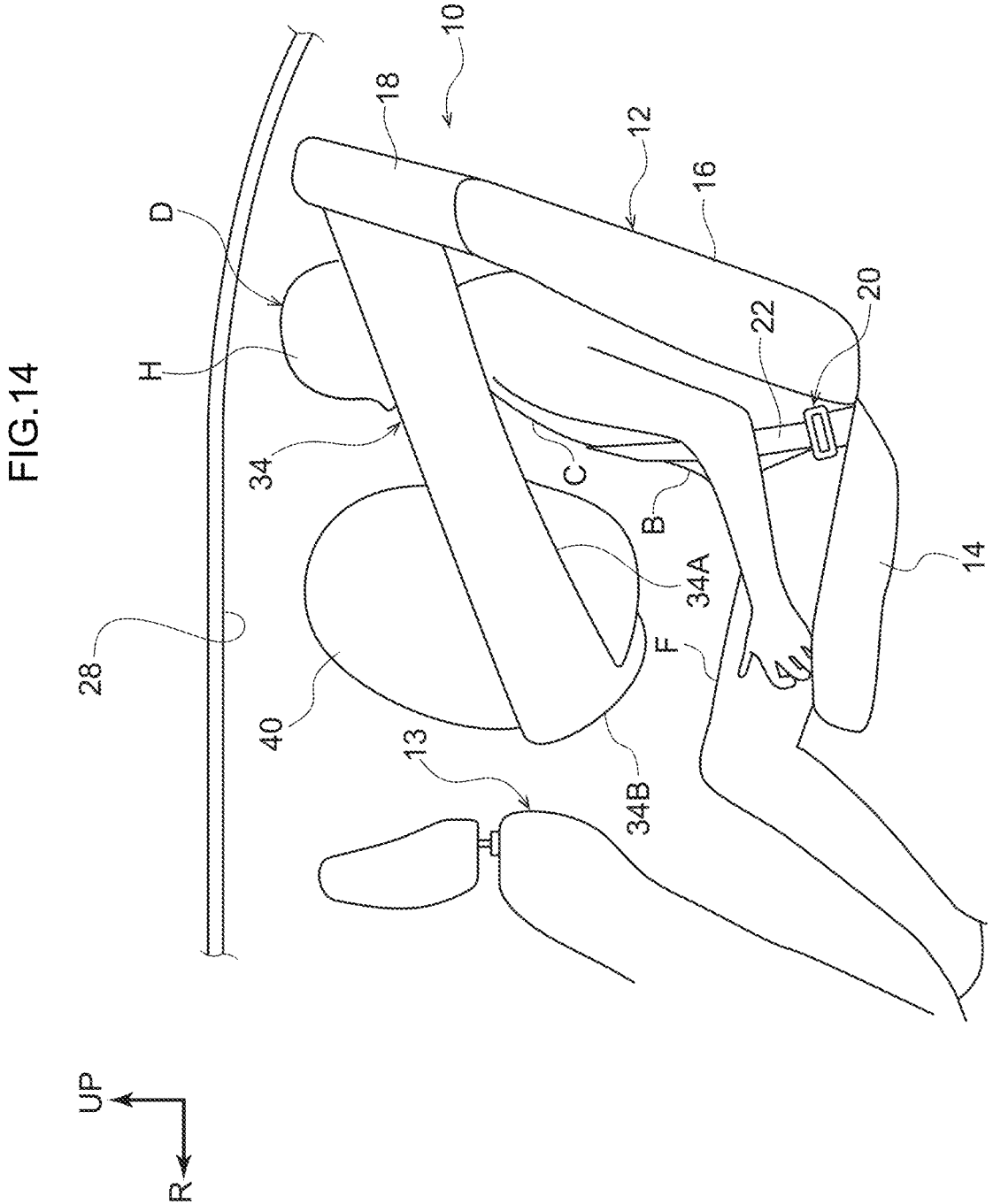
FIG. 14 is a schematic side view showing a later time of the inflation and expansion of the airbag according to the first exemplary embodiment.

In association with inflation and expansion of the pair of front-and-rear chambers 34 (the front-and-rear extending portions 34A), the airbag main body 40 moves to the front side, passing between the head area H of the occupant D and a vehicle cabin ceiling 28 (see FIG. 12 to FIG. 14). Then, when gas is supplied from the pair of front-and-rear chambers 34, the rear side of the front side connecting portion 34B inflates and expands, with a delay relative to the pair of front-and-rear chambers 34, to the side thereof at which the occupant D is disposed (the rear side thereof), and the rear side of the front side connecting portion 34B is disposed between the pair of front-and-rear chambers 34 (the front-and-rear extending portions 34A) at the front side of the occupant D.

Figure 5:
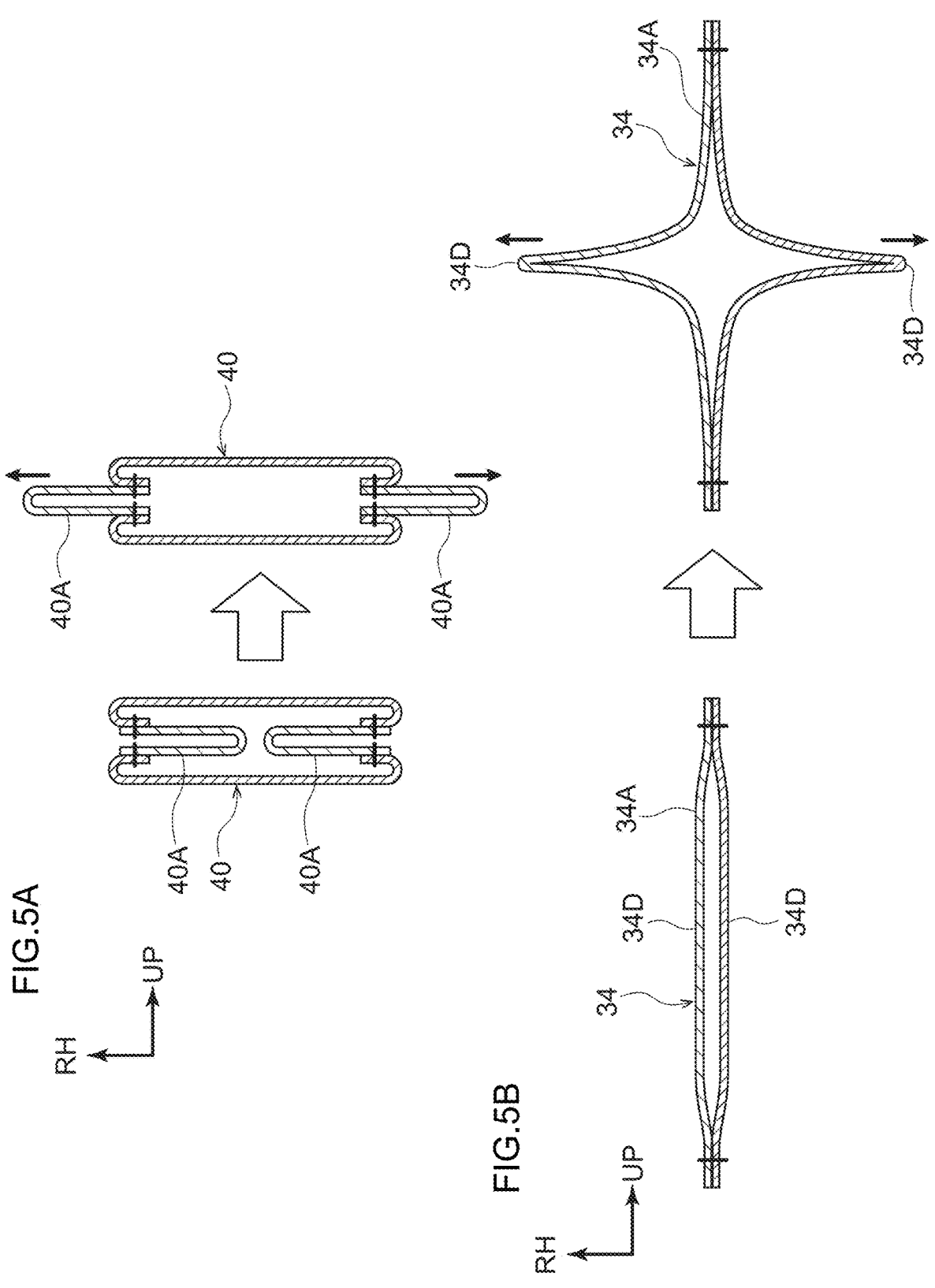
FIG. 5A is a schematic magnified sectional diagram cut along line X-X in FIG. 4.
FIG. 5B is a schematic magnified sectional diagram cut along line Y-Y in FIG. 4.

The airbag main body 40 is formed in a bag shape by a single base cloth being folded in a predetermined shape and peripheral edge portions thereof being sewn together (see FIG. 5A). A base cloth structures the front side connecting portion 34B of the front-and-rear chambers 34. The periphery of a communication hole (not shown in the drawings) formed in a rear face of a left-and-right direction central portion of this base cloth and the periphery of a connection hole (not shown in the drawings) formed in the base cloth of the airbag main body 40 are sewn together, connecting the two base cloths to one another. The base cloths of the front-and-rear chambers 34 and the base cloth of the airbag main body 40 are each constituted of, for example, a polyamide- or polyester-based fabric.

As shown in FIG. 4 and FIG. 5A, before the airbag main body 40 is folded (wound) into a roll shape, both of left and right side base cloths 40A, which are invaginated to seat width direction inner sides, are pulled out to the seat width direction outer sides and squashed substantially flat. As shown in FIG. 4 and FIG. 5B, before the pair of front-and-rear chambers 34 are folded into concertina shapes, vertical direction substantially central portions of respective base cloths 34D thereof are pulled out to the seat width direction outer sides and squashed substantially flat.

Figure 6:
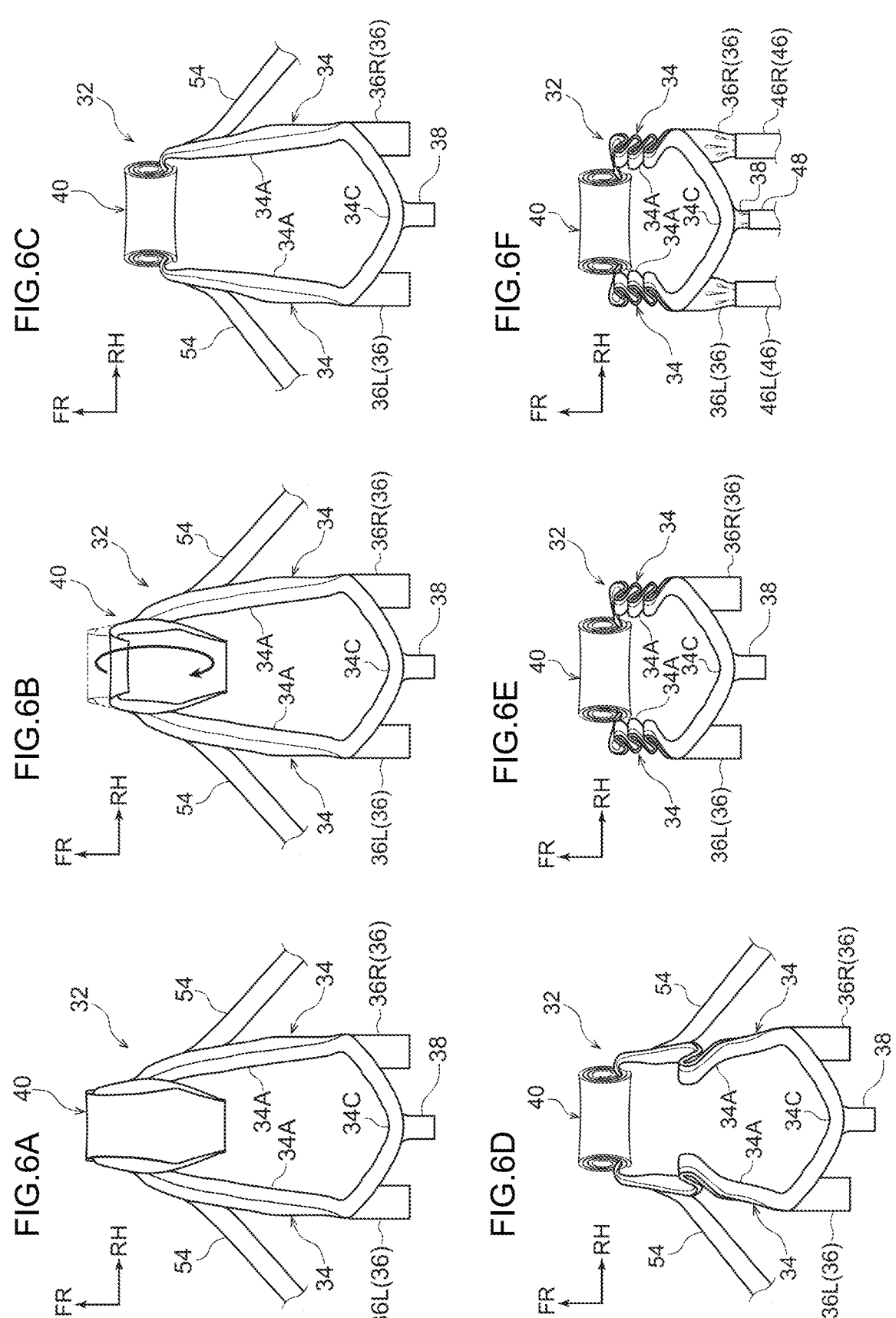
FIG. 6A to FIG. 6F are schematic plan views showing steps in folding of the airbag according to the first exemplary embodiment.

In this state, the airbag 32 is folded up as shown in FIG. 6A to FIG. 6F. Firstly, as shown in FIG. 6A to FIG. 6C, the airbag main body 40 is wound into the roll shape from the front side. That is, the airbag main body 40 is folded up in an outer-wound roll shape such that unfolding will be facilitated by an inertial force associated with movement to the front side.

Then, as shown in FIG. 6D to FIG. 6F, the pair of front-and-rear chambers 34 (the front-and-rear extending portions 34A) are folded up in concertina shapes. Note that this concertina folding of the pair of front-and-rear chambers 34 (the front-and-rear extending portions 34A) forms concertina folds in which precisely three mountain-fold regions are formed. FIG. 6F shows a state in which the distribution pipes 46 and 48 of the distribution piping 50, which are described below, are connected.

Figure 7:
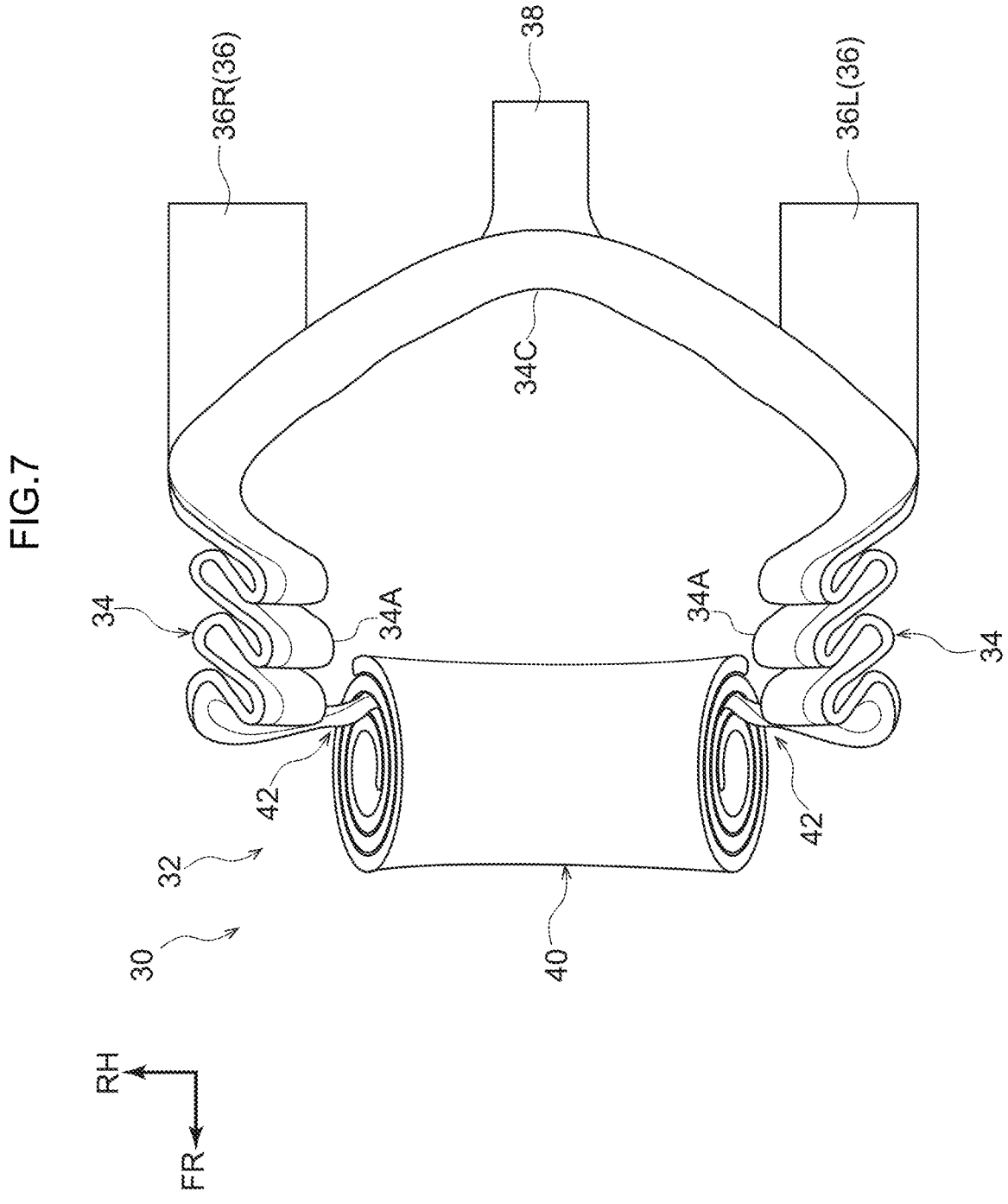
FIG. 7 is a schematic plan view showing a state of the airbag according to the first exemplary embodiment after folding.

This folded state is shown in FIG. 7. Boundary portions 42 between the airbag main body 40 folded into the roll shape and the pair of front-and-rear chambers 34 folded into the concertina shapes are creased regions at which the pair of front-and-rear chambers 34 are turned to the lower side. The airbag 32 in this state, in which the pair of front-and-rear chambers 34 folded into the concertina shapes are turned down to the lower side relative to the airbag main body 40 folded into the roll shape, is stowed inside the headrest 18 as illustrated in FIG. 8.

In an elevation view, the airbag 32 is structured to be arranged along an exterior shape (an upper face and left and right side faces) of the headrest 18. In a state before the pair of front-and-rear chambers 34 are turned down to the lower side as shown in FIG. 8, lengths of the airbag 32 in the seat width direction from a center line (not shown in the drawings) of the airbag main body 40 to the seat width direction outer side end portions of the pair of front-and-rear chambers 34 are 200 mm to 400 mm, and locations of the boundary portions 42 are at positions around 100 mm to 200 mm from the seat width direction outer side end portions of the front-and-rear chambers 34.

Tear lines, which are not shown in the drawings, are formed in a front face of the headrest 18. The tear lines are structured so as to, at a time of inflation and expansion of the airbag 32, rupture under expansion pressure from the airbag 32. Hence, the pair of front-and-rear chambers 34 and the airbag main body 40 of the airbag 32, in that order, may inflate and expand to the front side from the front face of the headrest 18.

As illustrated in FIG. 9, the distribution piping 50 that is fabricated of resin or fabricated of metal is disposed at the rear side of the interior of the headrest 18. The distribution piping 50 branches in three directions, including the circular tube-shaped branch pipes 46, which branch respectively to left and right from a seat width direction central portion of the distribution piping 50, and the circular tube-shaped distribution pipe 48, which branches to the upper side from the seat width direction central portion. Below, the branch pipe 46 that branches to the left side from the seat width direction central portion of the distribution piping 50 may be described as the branch pipe 46L, and the branch pipe 46 that branches to the right side from the seat width direction central portion of the distribution piping 50 may be described as the branch pipe 46R.

As shown in FIG. 10, in side view, each of the jetting out aperture 46A of the branch pipe 46L at the left side and the jetting out aperture 46A of the branch pipe 46R at the right side extends a predetermined length to the front-upper side at a predetermined angle (for example, 20°-30° relative to the horizontal). Also in the side view, the jetting out aperture 48A of the distribution pipe 48 at the upper side extends a predetermined length to the front-upper side at a predetermined angle (for example, 20°-30° relative to the horizontal).

The predetermined lengths of the jetting out apertures 46A and 48A referred to here are, for example, preferably 30 mm to 40 mm. If the lengths of the jetting out apertures 46A and 48A are shorter than 30 mm, the gas may not be jetted out in intended directions, and if the lengths are greater than 40 mm, a thickness of the headrest 18 may be increased without purpose.

Figure 11:
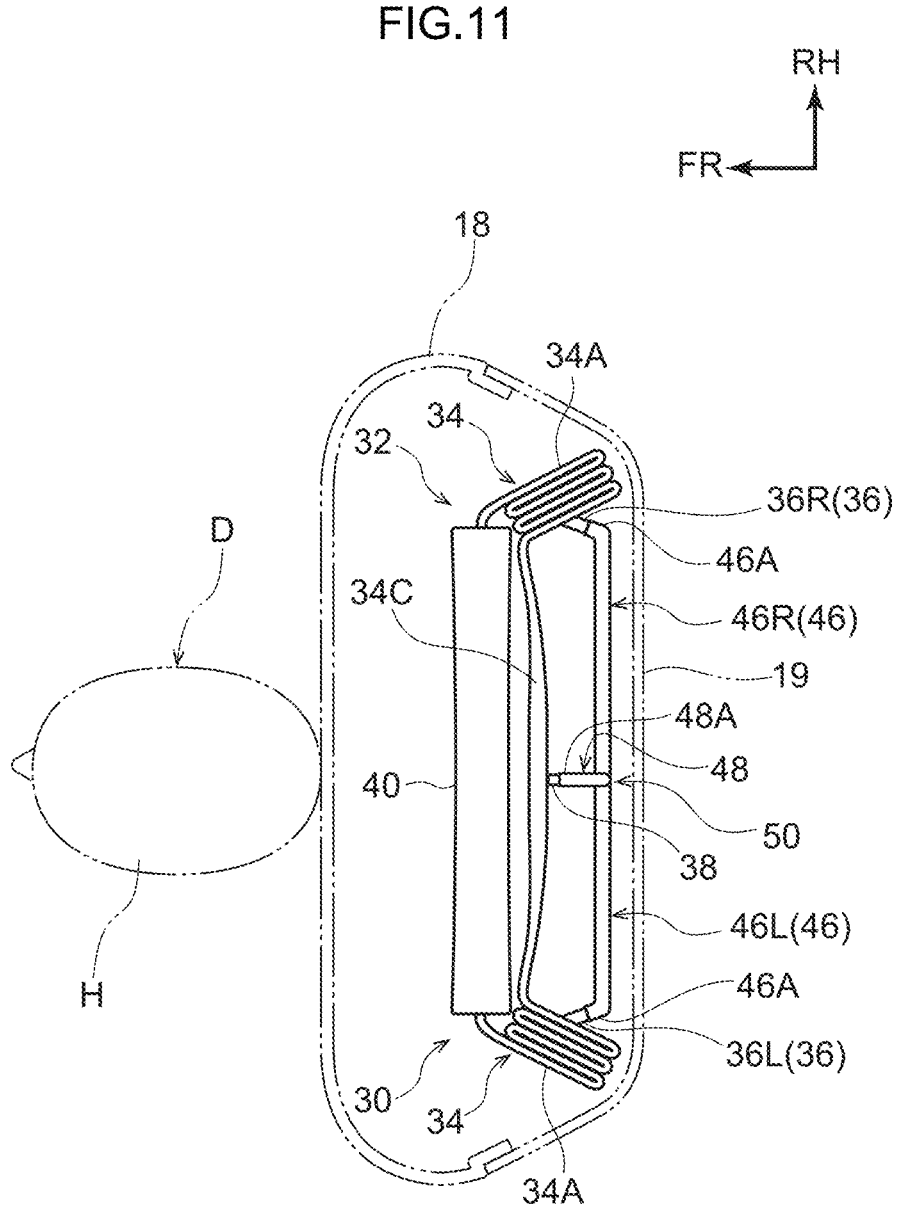
FIG. 11 is a schematic plan view showing a partial section of the airbag according to the first exemplary embodiment stowed in the headrest.

As shown in FIG. 11, in plan view, the jetting out aperture 46A of the branch pipe 46L at the left side and the jetting out aperture 46A of the branch pipe 46R at the right side extend to the front at the seat width direction outer sides at predetermined angles (for example, 10°-20° relative to the front-and-rear direction). Hence, because the pair of front-and-rear chambers 34 inflate and expand to the front at the seat width direction outer sides, the airbag main body 40 in the roll shape is pulled out to the seat width direction outer sides while moving from the rear side to the front side.

As shown in FIG. 4 and FIG. 6F, the jetting out aperture 46A of the branch pipe 46L at the left side and the jetting out aperture 46A of the branch pipe 46R at the right side are connected to the source portion 36L at the left side and the source portion 36R at the right side of the rear side connecting portion 34C, and the jetting out aperture 48A of the distribution pipe 48 at the upper side is connected to the source portion 38 at the middle of the rear side connecting portion 34C. As shown in FIG. 10, in the state in which the airbag 32 is stowed in the interior of the headrest 18, the left and right source portions 36L and 36R (FIG. 10 depicts only the source portion 36L at the left side) are disposed at respective vertical direction substantially central portions of the rear sides of the pair of front-and-rear chambers 34.

That is, the jetting out aperture 46A of the branch pipe 46L at the left side and the jetting out aperture 46A of the branch pipe 46R at the right side (FIG. 10 depicts only the branch pipe 46L at the left side) are disposed at the respective vertical direction substantially central portions of the rear sides of the pair of front-and-rear chambers 34 in side view. As illustrated in FIG. 9, internal diameters of the jetting out aperture 46A of the branch pipe 46L at the left side and the jetting out aperture 46A of the branch pipe 46R at the right side are the same as one another and are larger (for example, around 1.2 times larger) than an internal diameter of the jetting out aperture 48A of the distribution pipe 48 at the upper side.

The jetting out aperture 44A of the inflator 44 is connected to a circular tube-shaped base portion 52 that extends to the lower side from a seat width direction central portion of the distribution piping 50. That is, the inflator 44 is structured so as to jet out the gas into the branch pipe 46L at the left side and the branch pipe 46R at the right side of the distribution piping 50, which are capable of supplying the gas to each of the pair of front-and-rear chambers 34, and so as to jet out the gas into the distribution pipe 48 at the upper side of the distribution piping 50, which is capable of supplying the gas to the middle of the rear side connecting portion 34C.

In the airbag device 30 with the structure described above, as shown in FIG. 1 to FIG. 3, the front-and-rear extending portions 34A of the inflated and expanded pair of front-and-rear chambers 34 extend in the front-and-rear direction at the left and right sides of the head area H of the occupant D, opposing the head area H from the left and right sides with respective gaps therebetween. In this state, the front end portions of the inflated and expanded pair of front-and-rear chambers 34A are connected in the left-and-right direction by the inflated and expanded front side connecting portion 34B. As a result, in plan view, the front-and-rear chambers 34, including the pair of front-and-rear extending portions 34A protruding from the headrest 18 and the front side connecting portion 34B, are structured to form a substantial "U" shape opening to the rear side (see FIG. 3).

After the airbag main body 40 has moved to the front side in association with the inflation and expansion of the pair of front-and-rear chambers 34, the airbag main body 40 is inflated and expanded toward the rear side (the side thereof at which the occupant D is disposed) by the gas being supplied from the front-and-rear chambers 34). That is, while the pair of front-and-rear chambers 34 inflate and expand, the airbag main body 40 remains folded in the roll shape and passes from the rear side to the front side through a narrow gap between the head area H of the occupant D and the vehicle cabin ceiling 28 (see FIG. 12 to FIG. 14).

The airbag main body 40 inflates and expands at the rear side of the front side connecting portion 34B, with a delay relative to the pair of front-and-rear chambers 34, to the side at which the occupant D is disposed (the rear side thereof). Thus, the inflated and expanded airbag main body 40 is formed so as to oppose the head area H, a chest area C and an abdomen area B of the occupant D with gaps therebetween in the front-and-rear direction (see FIG. 1 to FIG. 3). The shape of the airbag main body 40 is specified such that when restraining the occupant from an intermediate stage to a later stage of the inflation and expansion, the airbag main body 40 is sandwiched between a thigh area F and the chest area C of the occupant D.

As shown in FIG. 1 to FIG. 3, a left and right pair of rear tethers 54, a left and pair of front upper tethers 56 and a left and right pair of front lower tethers 58 are attached to the airbag 32. The rear tethers 54, front upper tethers 56 and front lower tethers 58 are formed in long, narrow shapes of, for example, a polyamide- or polyester-based fabric. The fabric constituting the rear tethers 54, front upper tethers 56 and front lower tethers 58 is constituted to be more resistant to stretching than the fabric constituting the front-and-rear chambers 34. The stretch resistance can be adjusted by material properties, thickness and the like of the fabric.

The pair of front upper tethers 56 are structured to link wall faces at the left and right sides of the front side of an upper portion of the airbag main body 40, which inflates and expands to the upper side relative to the front-and-rear chambers 34, with corresponding front portions of the pair of front-and-rear extending portions 34A. That is, respective one end portions of the pair of front upper tethers 56 are sewn to the wall faces at the left and right sides of the front side of the upper portion of the airbag main body 40 that inflates and expands further to the upper side than the front-and-rear chambers 34. Respective other end portions of the pair of front upper tethers 56 are sewn to the front portions of the pair of front-and-rear extending portions 34A.

The pair of front lower tethers 58 are structured to link wall faces at the left and right sides of the front side of a lower portion of the airbag main body 40, which inflates and expands to the lower side relative to the front-and-rear chambers 34, with corresponding front portions of the pair of front-and-rear extending portions 34A. That is, respective one end portions of the pair of front lower tethers 58 are sewn to the wall faces at the left and right sides of the front side of the lower portion of the airbag main body 40 that inflates and expands further to the lower side than the front-and-rear chambers 34. Respective other end portions of the pair of front lower tethers 58 are sewn to the front portions of the pair of front-and-rear extending portions 34A.

Meanwhile, one end portions of the pair of rear tethers 54 are attached by sewing to corresponding lower faces of the front portions of the front-and-rear chambers 34 (the front-and-rear extending portions 34A) that, in the seat width direction, oppose substantially central portions in side view of the inflated and expanded airbag main body 40. Respective other end portions of the pair of rear tethers 54 are attached to side portions of the seat back 16 (or to a vehicle body, which is not shown in the drawings, at the rear side relative to the occupant D). Therefore, in the inflated and expanded state of the airbag 32, the pair of rear tethers 54 extend diagonally to the lower-rear side at the lower side of the pair of front-and-rear extending portions 34A.

That is, the pair of rear tethers 54 attain an inclined attitude that is angled diagonally to the lower-rear side in side view. Consequently, during restraint of the occupant D by the airbag 32, the airbag main body 40 is relatively drawn (pulled) diagonally to the lower-rear side by the pair of rear tethers 54 and, in side view, the airbag main body 40 and the front portions of the pair of front-and-rear extending portions 34A are relatively drawn, around the headrest 18, diagonally to the lower-rear side.

The following operations are described for the airbag device 30 according to the first exemplary embodiment with the structure described above.

The pair of front-and-rear chambers 34 that are seat width direction both end portions of the airbag 32, which includes the pair of front-and-rear chambers 34 and the airbag main body 40, are turned to the lower side so as to lie along the exterior shape of the headrest 18 of the vehicle seat 12 in elevation view, and the airbag 32 is stowed in the headrest 18. Thus, the airbag 32 is compactly stored in the interior of the headrest 18.

The headrest 18 in which the airbag 32 is stowed is formed integrally with the seat back 16. Therefore, detachment of the airbag 32 (the airbag device 30) from the vehicle seat 12 may be prevented more effectively than if the headrest 18 were a separate body from the seat back 16.

When a frontal collision of the vehicle is detected (or predicted) by a collision sensor, the inflator 44 is activated by control from the control unit. That is, gas is produced and jetted out from the inflator 44. The gas jetted out from the inflator 44 passes through the distribution piping 50 and is supplied to the pair of front-and-rear chambers 34 and the rear side connecting portion 34C of the airbag 32.

Accordingly, the tear lines of the headrest 18 rupture under inflation pressure of the pair of front-and-rear chambers 34 and inflation pressure of the rear side connecting portion 34C via the airbag main body 40, which is to say a pressure force pressing the airbag main body 40 toward the front side in the state in which the inflating rear side connecting portion 34C is folded in a roll shape.

In elevation view, the pair of front-and-rear chambers 34 stowed inside the headrest 18 are in the state of being turned to the lower side relative to the airbag main body 40 that is folded in the roll shape. In side view, the jetting out apertures 46A of the left and right branch pipes 46 of the distribution piping 50, which supply the gas jetted out from the inflator 44 to the pair of front-and-rear chambers 34, extend by the predetermined lengths toward the front-upper side at the predetermined angles and are disposed at the vertical direction substantially central portions of the rear sides of the pair of front-and-rear chambers 34.

Therefore, when the gas starts to jet out from the jetting out apertures 46A and the pair of front-and-rear chambers 34 start to inflate and expand, the vertical direction substantially central portions of the rear sides of the pair of front-and-rear chambers 34 may be pushed toward the front side more effectively, and the expansion directions of the pair of front-and-rear chambers 34 may be consistent.

For example, if the jetting out apertures 46A of the left and right branch pipes 46 of the distribution piping 50 that supply the gas jetted out from the inflator 44 to the pair of front-and-rear chambers 34 were disposed at lower end portions of the rear sides of the pair of front-and-rear chambers 34 in side view, the pair of front-and-rear chambers 34 would tilt back at the time of the start of inflation and expansion, and pushing the pair of front-and-rear chambers 34 out toward the front side would be difficult.

In contrast, because the present exemplary embodiment is structured as described above, a problem such that the pair of front-and-rear chambers 34 tilt back does not occur and expansion directions of the pair of front-and-rear chambers 34 are consistent. Therefore, as shown in FIG. 12, the pair of front-and-rear chambers 34 inflate and expand from the front face of the headrest 18 along the left and right sides of the head area H of the occupant D to the front side.

As a result, an expansion action of the airbag main body 40 moving in association with the inflation and expansion of the pair of front-and-rear chambers 34 may be consistent. Therefore, the airbag main body 40 that is folded in the roll shape may move to the front side at the upper side of the head area H of the occupant D, that is, through a narrow gap between the head area H of the occupant D and the vehicle cabin ceiling 28 in association with the inflation and expansion of the pair of front-and-rear chambers 34.

Thus, when the pair of front-and-rear chambers 34 inflate and expand and the airbag main body 40 that has been folded into the roll shape moves to the front side, as illustrated in FIG. 13, the head area H of the occupant D is relatively inserted into a space encircled by the front-and-rear extending portions 34A of the pair of front-and-rear chambers 34 and the airbag main body 40 that is folded in the roll shape.

Then, as illustrated in FIG. 14, the airbag main body 40 is inflated and expanded to the side thereof at which the occupant D is disposed by the gas being supplied via communication holes from the front side connecting portion 34B, which links the front end portions of the front-and-rear extending portions 34A of the pair of front-and-rear chambers 34 in the left-and-right direction. Thus, the airbag main body 40 is disposed between the pair of front-and-rear chambers 34 at the front side of the occupant D.

Thus, after the inflation and expansion of the pair of front-and-rear chambers 34 is complete, the gas from the inflator 44 is supplied to the airbag main body 40 via the communication holes of the front side connecting portion 34B. In other words, the gas that has been jetted out from the inflator 44 and flowed through the pair of front-and-rear extending portions 34A of the front-and-rear chambers 34 and the front side connecting portion 34B is supplied through the communication holes into the airbag main body

40. Therefore, the airbag main body 40 may be inflated and expanded with a sufficient delay relative to the pair of front-and-rear chambers 34.

Accordingly, while the airbag main body 40 remains folded in the roll shape, the airbag main body 40 may reliably and easily pass through the narrow gap between the head area H of the occupant D and the vehicle cabin ceiling 28 from the rear side to the front side in association with the inflation and expansion of the pair of front-and-rear chambers 34. Therefore, a problem of the airbag main body 40 becoming stuck in the narrow gap may be prevented and expansion failures of the airbag 32 may be suppressed or prevented.

In the present exemplary embodiment, because the distribution piping 50 is provided inside the headrest 18, a mounting position of the inflator 44 is not subject to constraint. Thus, the inflator 44 may be provided, for example, along the direction of extension of the seat back 16 (with an axial direction of the inflator 44 in a vertical direction), and may be provided inside the seat back 16 or spanning from the interior of the seat back 16 to the interior of the headrest 18. Thus, an increase in size (an increase in thickness) of the seat back 16 and the headrest 18 may be restrained.

During the inflation and expansion of the airbag main body 40, the pair of front upper tethers 56 respectively link portions at the left and right sides of the front side of the upper portion of the airbag main body 40 with the front portions of the pair of front-and-rear extending portions 34A. When the inflation and expansion of the airbag main body 40 (the airbag 32) is complete, the pair of front upper tethers 56 restrain unintended displacement (turning) of the airbag main body 40 to the upper side relative to the front-and-rear chambers 34 around the front side connecting portion 34B.

During the inflation and expansion of the airbag main body 40, the pair of front lower tethers 58 respectively link portions at the left and right sides of the front side of the lower portion of the airbag main body 40 with the front portions of the pair of front-and-rear extending portions 34A. When the inflation and expansion of the airbag main body 40 (the airbag 32) is complete, the pair of front lower tethers 58 restrain unintended displacement (turning) of the airbag main body 40 to the lower side relative to the pair of front-and-rear chambers 34 around the front side connecting portion 34B.

When the inflation and expansion of the airbag 32 is complete, the pair of rear tethers 54 extend diagonally to the lower-rear sides at the lower sides of the pair of front-and-rear extending portions 34A. That is, the pair of rear tethers 54 limit movement of the airbag main body 40 diagonally to the upper-front side. Thus, swinging of the airbag 32 in the vertical direction and in the front-and-rear direction may be suppressed (contributing to consistency of the expansion action of the airbag main body 40).

At a time of frontal collision of the vehicle in this state, inertial movement of the occupant D to the front side due to the collision is restrained by the airbag main body 40. More specifically, during the restraint of the occupant D, the front-and-rear chambers 34 (the front-and-rear extending portions 34A are extended to the front side by movement of the occupant D to the front side, and the airbag main body 40 is compressively deformed to the front side by being pushed toward the front side by the occupant D.

Therefore, energy absorption performance of the airbag main body 40 may be improved, and occupant restraint performance may be assured effectively. That is, when both of the pair of front-and-rear chambers 34 and the airbag main body 40 are subjected to a tension load, a load acting on the occupant D from the airbag main body 40 increases, but the load acting on the occupant D may be reduced by the compressive deformation of the airbag main body 40.

In addition, the airbag main body 40 is specified with a shape so as to be sandwiched between the thigh area F and chest area C of the occupant D from an intermediate stage to a later stage of a time of occupant restraint by the airbag 32. Therefore, contact may be made with the upper half of the occupant D over a large area. As a result, a load acting on the occupant D from the airbag main body 40 may be excellently moderated.

After the inflation and expansion of the front-and-rear chambers 34, the airbag main body 40 inflates and expands to the side thereof at which the occupant D is disposed, at the rear side of the front side connecting portion 34B. Consequently, a gap between the airbag main body 40 and the occupant D is made smaller. Therefore, the occupant D is promptly restrained at the airbag main body 40 and initial occupant restraint performance of the occupant D by the airbag main body 40 may be improved.

Because the pair of rear tethers 54 are more resistant to stretching than the pair of front-and-rear chambers 34, the airbag main body 40 is relatively pulled diagonally to the lower-rear side by the pair of rear tethers 54 during restraint of the occupant D. Therefore, a vertical direction position of the airbag main body 40 relative to the head area H of the occupant D at a time of occupant restraint may be consistent. Thus, according to this airbag 32, the occupant D may be restrained appropriately.

Second Exemplary Embodiment

Now, the airbag device 30 according to a second exemplary embodiment is described. Portions that are the same as in the first exemplary embodiment are assigned the same reference symbols and detailed descriptions thereof (including operations that are the same) are omitted as appropriate.

Figures 15A, 15B:
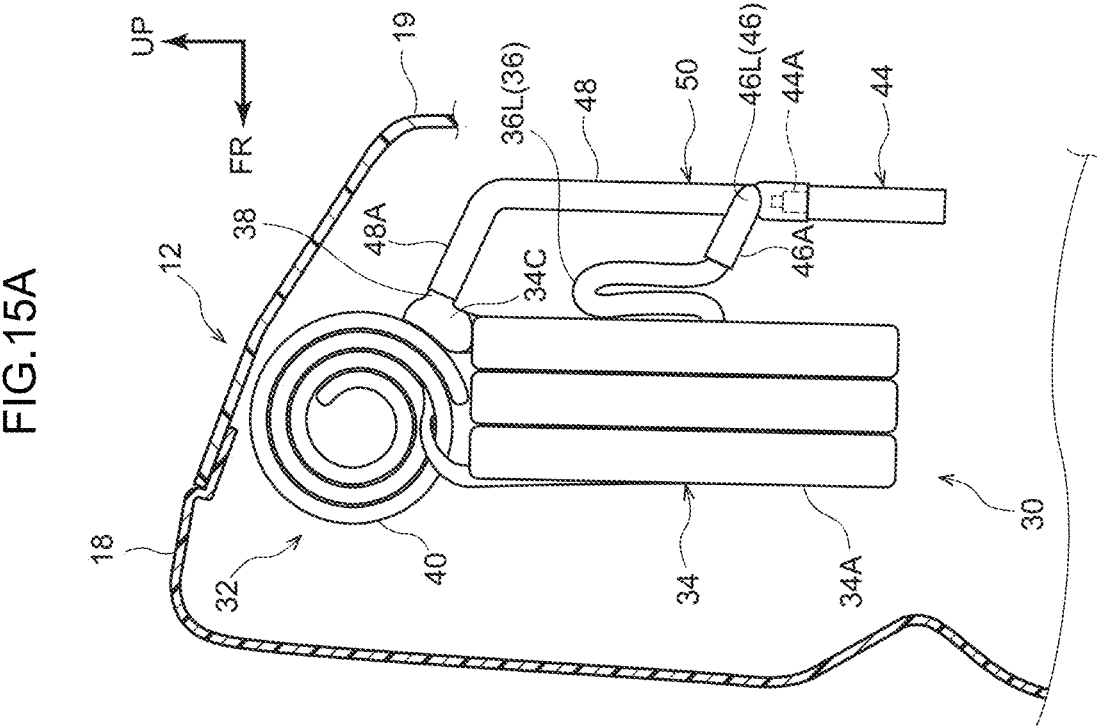
FIG. 15A is a schematic side view showing a partial section of a state before gas is supplied to an airbag according to a second exemplary embodiment.
FIG. 15B is a schematic side view showing a partial section of a state just after the gas is supplied to the airbag according to the second exemplary embodiment.

As shown in FIG. 15A, in the airbag device 30 according to the second exemplary embodiment, the source portion 36L at the left side of the pair of front-and-rear chambers 34 and the source portion 36R at the right side (only the source portion 36L at the left side is shown in FIG. 15A and FIG. 15B) are connected to the jetting out apertures 46A of, respectively, the branch pipe 46L at the left side of the distribution piping 50 and the branch pipe 46R at the right side (only the branch pipe 46L at the left side is shown in FIG. 15A and FIG. 15B). The airbag device 30 according to the second exemplary embodiment differs from the first exemplary embodiment described above only in being stowed in the headrest 18 in a state in which, in side view, the source portion 36L at the left side and source portion 36R at the right side are each folded in an upward protruding shape (a substantially circular arc shape protruding toward the upper side).

When the left and right source portions 36L and 36R of the pair of front-and-rear chambers 34 that are connected to the jetting out apertures 46A of, respectively, the left and right branch pipes 46L and 46R of the distribution piping 50 are stowed in this state in which, in side view, the left and right source portions 36L and 36R are folded in the upward protruding shape, then as illustrated in FIG. 15B, when the gas is supplied through the jetting out apertures 46A and the left and right source portions 36L and 36R inflate and expand, upper portions of the rear sides of the pair of front-and-rear chambers 34 may be pushed to the lower-front side by the inflating and expanding left and right source portions 36R and 36L.

The gas is supplied (jetted out) by the inflating and expanding left and right source portions 36L and 36R into the vertical direction central portions of the rear sides of the pair of front-and-rear chambers 34 from the upper-rear side toward the lower-front side in side view. As a result, the pair of front-and-rear chambers 34 may be more effectively pushed out to the lower-front side. Therefore, the expansion directions of the pair of front-and-rear chambers 34 may be more effectively made consistent.

Above, the seat-mounted airbag device 30 according to the present exemplary embodiments is described by reference to the drawings. However, the seat-mounted airbag device 30 according to the present exemplary embodiments is not limited to the structures shown in the drawings; suitable design modifications may be applied within a scope not departing from the gist of the present disclosure.

For example, the distribution piping 50 may be provided to span between the interior of the headrest 18 and the interior of the seat back 16. Further, the source portions 36 and 38 shown in the drawings are inserted into and attached to inner sides of the jetting out apertures 46A and 48A, but this is not limiting. Structures are possible in which the source portions cover and are attached to outer sides of the jetting out apertures 46A and 48A.

Further, the distribution piping 50 inside the headrest 18 need not be provided. Although not shown in the drawings, the jetting out apertures 44A of three inflators 44 may be directly connected to the respective source portions 36L, 36R and 38. In this structure, the inflators 44 protrude diagonally to the lower-rear side, as a result of which the thickness of the headrest 18 is increased. However, the same effects as described above are provided if the jetting out apertures 44A of the two inflators 44 that are directly connected to the left and right source portions 36L and 36R are disposed at the respective vertical direction substantially central portions of the rear sides of the pair of front-and-rear chambers 34.

What is claimed is:

1. A seat-mounted airbag device, comprising:

an inflator provided at a vehicle seat of a vehicle, the inflator being configured to jet out a gas at a time of collision of the vehicle; and an airbag including a pair of front-and-rear chambers to which the gas to be jetted out from the inflator is supplied, the pair of front-and-rear chambers being configured for inflating and expanding to a seat front side of the vehicle seat along both left and right sides of a head of a vehicle occupant sitting on the vehicle seat, and an airbag main body that is configured to, in association with the inflation and expansion of the pair of front-and-rear chambers, pass between the head of the vehicle occupant and a vehicle cabin ceiling and move to the seat front side of the vehicle seat, in response to the gas being supplied to the airbag main body from the pair of front-and-rear chambers, the airbag main body being configured for inflating and expanding rearwardly between the pair of front-and-rear chambers to be disposed in front of the vehicle occupant, wherein, in an elevation view seen from the seat front side of the vehicle seat, the pair of front-and-rear chambers are folded toward a seat lower side of the vehicle seat relative to the airbag main body and stowed in a headrest of the vehicle seat, as seen from a side view in a seat width direction of the vehicle seat, a jetting out aperture at which the gas is to be jetted out from the inflator is positioned at a central portion of the pair of front-and-rear chambers in a vertical direction and at a rear side of the pair of front-and-rear chambers, the seat-mounted airbag device further comprises distribution piping that includes a pair of jetting out apertures corresponding to the pair of front-and-rear chambers, respectively, the pair of jetting out apertures including the jetting out aperture, the pair of front-and-rear chambers includes a pair of source portions that are connected to the pair of jetting out apertures, respectively, and the pair of source portions are stowed in the headrest in a state that each source portion of the pair of source portions is folded upward to define an upward protruding shape as seen from the side view in the seat width direction.

2. A seat-mounted airbag device, comprising:

an inflator provided at a vehicle seat of a vehicle, the inflator being configured to jet out a gas at a time of collision of the vehicle; and an airbag including a pair of front-and-rear chambers to which the gas to be jetted out from the inflator is supplied, the pair of front-and-rear chambers being configured for inflating and expanding to a seat front side of the vehicle seat along both left and right sides of a head of a vehicle occupant sitting on the vehicle seat, and an airbag main body that is configured to, in association with the inflation and expansion of the pair of front-and-rear chambers, pass between the head of the vehicle occupant and a vehicle cabin ceiling and move to the seat front side of the vehicle seat, in response to the gas being supplied to the airbag main body from the pair of front-and-rear chambers, the airbag main body being configured for inflating and expanding rearwardly between the pair of front-and-rear chambers to be disposed in front of the vehicle occupant, wherein, in an elevation view seen from the seat front side of the vehicle seat, the pair of front-and-rear chambers are folded toward a seat lower side of the vehicle seat relative to the airbag main body and stowed in a headrest of the vehicle seat, as seen from a side view in a seat width direction of the vehicle seat, a jetting out aperture at which the gas is to be jetted out from the inflator is positioned at a central portion of the pair of front-and-rear chambers in a vertical direction and at a rear side of the pair of front-and-rear chambers, the seat-mounted airbag device further comprises distribution piping that is provided at the vehicle seat and is configured to supply the gas jetted out from the inflator to each of the pair of front-and-rear chambers through a corresponding source portion of a pair of source portions of the pair of front-and-rear chambers, the distribution piping includes a pair of jetting out apertures corresponding to the pair of front-and-rear chambers, respectively, the pair of jetting out apertures including the jetting out aperture, the pair of jetting out apertures is connected to the pair of source portions of the pair of front-and-rear chambers, respectively, as seen from the side view in the seat width direction, the pair of jetting out apertures extends forward and upward in a predetermined length towards the rear side of the pair of front-and-rear chambers, and each jetting out aperture of the pair of jetting out apertures is positioned at a central portion of the corresponding front-and-rear chamber in the vertical direction and at the rear side of the pair of front-and-rear chambers, and each source portion of the pair of source portions is stowed in the headrest in a state that each of the pair of source portions is folded upward to define an upward protruding shape as seen from the side view in the seat width direction.

* * * * *